US009850008B2

(12) United States Patent
Zegler

(10) Patent No.: US 9,850,008 B2
(45) Date of Patent: *Dec. 26, 2017

(54) INTEGRATED VEHICLE FLUIDS

(71) Applicant: United Launch Alliance, LLC, Centennial, CO (US)

(72) Inventor: Frank C. Zegler, Idledale, CO (US)

(73) Assignee: UNITED LAUNCH ALLIANCE, L.L.C., Centennial, CO (US)

( * ) Notice: Subject to any disclaimer, the term of this patent is extended or adjusted under 35 U.S.C. 154(b) by 887 days.

This patent is subject to a terminal disclaimer.

(21) Appl. No.: 14/506,086

(22) Filed: Oct. 3, 2014

(65) Prior Publication Data

US 2015/0060604 A1 Mar. 5, 2015

Related U.S. Application Data

(63) Continuation of application No. 13/044,382, filed on Mar. 9, 2011, now Pat. No. 8,884,202.

(51) Int. Cl.
*B64G 1/26* (2006.01)
*B64G 1/40* (2006.01)
(Continued)

(52) U.S. Cl.
CPC ............... *B64G 1/26* (2013.01); *B64G 1/002* (2013.01); *B64G 1/401* (2013.01); *B64G 1/402* (2013.01);
(Continued)

(58) Field of Classification Search
CPC .. F02K 9/42; F02K 9/44; B64G 1/002; B64G 1/22; B64G 1/24; B64G 1/26; B64G 1/40;
(Continued)

(56) References Cited

U.S. PATENT DOCUMENTS 3,156,433 A 11/1964 White, Jr.
3,266,422 A 8/1966 Matheisel
(Continued)

FOREIGN PATENT DOCUMENTS

JP 4086329 3/1992
WO WO 2005/047568 5/2005

OTHER PUBLICATIONS

Morgan et al. "Development of a Hydrogen-Oxygen Internal Combustion Engine Space Power System," Prepared under Contract No. NAS-3-2787 by Vickers, Inc. Detroit Mich. For NASA, Jul. 1965, 204 pages.

(Continued)

*Primary Examiner* — Bernarr E Gregory
(74) *Attorney, Agent, or Firm* — Sheridan Ross P.C.

(57) ABSTRACT

A system and methods are provided for combining systems of an upper stage space launch vehicle for enhancing the operation of the space vehicle. Hydrogen and oxygen already on board as propellant for the upper stage rockets is also used for other upper stage functions to include propellant tank pressurization, attitude control, vehicle settling, and electrical requirements. Specifically, gases from the propellant tanks, instead of being dumped overboard, are used as fuel and oxidizer to power an internal combustion engine that produces mechanical power for driving other elements including a starter/generator for generation of electrical current, mechanical power for fluid pumps, and other uses. The exhaust gas from the internal combustion engine is also used directly in one or more vehicle settling thrusters. Accumulators which store the waste ullage gases are pressurized and provide pressurization control for the propellant tanks. The system is constructed in a modular configuration in which two redundant integrated fluid mod-
(Continued)

ules may be mounted to the vehicle, each of the modules capable of supporting the upper stage functions.

19 Claims, 10 Drawing Sheets

(51) Int. Cl.
  *B64G 1/42* (2006.01)
  *F02K 9/44* (2006.01)
  *B64G 1/00* (2006.01)
(52) U.S. Cl.
  CPC .............. *B64G 1/421* (2013.01); *B64G 1/425* (2013.01); *F02K 9/44* (2013.01)
(58) Field of Classification Search
  CPC .......... B64G 1/401; B64G 1/402; B64G 1/42; B64G 1/421; B64G 1/425; B63G 8/08; F01K 25/005
  See application file for complete search history.

(56) References Cited

U.S. PATENT DOCUMENTS

| | | |
|---|---|---|
| 3,572,297 A | 3/1971 | Murray |
| 4,403,153 A | 9/1983 | Vallon |
| 4,413,795 A | 11/1983 | Ryan |
| 4,442,801 A | 4/1984 | Glynn et al. |
| 4,898,342 A | 2/1990 | Kranz et al. |
| 4,964,593 A | 10/1990 | Kranz |
| 5,123,611 A | 6/1992 | Morgand |
| 5,282,357 A | 2/1994 | Sackheim |
| 5,315,158 A | 5/1994 | Danielson |
| 5,435,274 A | 7/1995 | Richardson, Jr. |
| 5,437,250 A | 8/1995 | Rabinovich et al. |
| 5,692,459 A | 12/1997 | Richardson, Jr. |
| 5,826,548 A | 10/1998 | Richardson, Jr. |
| 5,899,175 A | 5/1999 | Manikowski, Jr. et al. |
| 6,135,393 A | 10/2000 | Sackheim et al. |
| 6,267,326 B1 | 7/2001 | Smith et al. |
| 6,787,258 B2 | 9/2004 | Prerad |
| 6,804,950 B2 | 10/2004 | Kong et al. |
| 6,817,182 B2 | 11/2004 | Clawson |
| 7,431,237 B1 | 10/2008 | Mock et al. |
| 7,540,143 B1 | 6/2009 | Greene |
| 7,552,702 B2 | 6/2009 | Stone |
| 8,430,361 B2 | 4/2013 | Raymond et al. |
| 8,884,202 B2 | 11/2014 | Zegler |
| 2002/0100836 A1* | 8/2002 | Hunt ....................... B63G 8/08 244/50 |
| 2005/0252214 A1* | 11/2005 | Goldmeer ............. F01K 25/005 60/698 |
| 2009/0000575 A1 | 1/2009 | Shimada et al. |

OTHER PUBLICATIONS

"Wankel engine," Wikipedia, printed Jul. 22, 2009, from http://en.wikipedia.org/wiki/Wankel_engine, 14 pages.
Notice of Allowance for U.S. Appl. No. 13/044,382, dated Jul. 2, 2014.

* cited by examiner

INTEGRATED VEHICLE FLUIDS

CROSS-REFERENCE TO RELATED APPLICATION

This application is a continuation application of U.S. Ser. No. 13/044,382 entitled "Integrated Vehicle Fluids" filed on Mar. 9, 2011, the entire disclosure of which is hereby incorporated herein by reference, now U.S. Pat. No. 8,884, 202.

FIELD OF THE INVENTION

The invention generally relates to rocket propulsion systems for space launch vehicles placed and maintained in planetary orbits. More specifically, the invention relates to systems and methods for propelling and powering an upper stage of a space launch vehicle by capturing waste ullage gases vented from the main upper stage propellant tanks, and generating power by an internal combustion engine used for replacement of power, pressurization, and reaction control systems traditionally powered by separate hydrazine systems and batteries.

BACKGROUND OF THE INVENTION

Over the past decade there have been increasing demands to lower the cost of space transport to geostationary and other orbits as well as perform missions which are simply not possible with existing launchers such as manned exploration of the moon and Mars. Implicit is the demand that reliability be enhanced and certainly not degraded. Unspoken but also implicit is that commercially viable launchers must fill this broad range of demands since single-purpose launchers such as the Saturn rocket or Space Shuttle are cost prohibitive, even for governments with substantial space budgets. The commercial launchers presently being used for most missions are the result of decades of evolution and have become highly refined and proven. Each individual system on the launchers has been raised to a high level of performance which is very difficult to improve upon, even with large investments in engineering development. Since only incremental improvements can be expected by addressing individual systems, there is a need to view space vehicle systems in a more broad sense to determine if substantial improvements can be accomplished.

One example of a high performance, highly evolved upper stage is the Centaur®. The Centaur® upper stage is capable of delivering payloads to nearly any orbit from Low earth Orbit to interplanetary trajectories. The Centaur® is capable of delivering a high energy to the payload by burning liquid hydrogen ($LH_2$) and liquid oxygen ($LO_2$) in a very high efficiency, low weight engine such as the RL10. The total mass of the Centaur when empty is less than 2.5 mt, yet it can contain in excess 20 mt of propellant. Propellants are stored in lightweight stainless steel tanks whose structural rigidity is provided primarily by the pressure of the propellants within the tank. In order to keep the tanks from collapsing prior to the loading of propellant, the tanks are pressurized with gas. In the Centaur®, a common double bulkhead is used to separate the $LO_2$ and $LH_2$ tanks. The two stainless steel containers are separated by a very thin layer of insulator which is contained within a hermetic cavity. Therefore, the appearance is of a single tank, but it is divided into the separate $LO_2$ and $LH_2$ tanks with an intermediate vacuum cavity. The extreme cold of the liquid hydrogen on one side of the bulk head creates a vacuum within the intermediate cavity. The insulator prevents the two metal bulkheads from contacting thereby maintaining a low thermal conductivity, thus preventing heat transfer from the comparatively warm $LO_2$ to the super cold $LH_2$. The exterior of the tanks are also insulated to suppress heat flows from the external environment to the propellants.

While on the ground and filled with propellants, the tank pressures are controlled by valving which maintains the tanks within a specific pressure band. The propellants within the tanks boil due to external heating and the vapor formed is passed through these regulating valves which hold the tank internal pressure within band regardless of the heating and attendant boil off vapor mass flow. By controlling the tank pressure at which the propellants boil, their saturation conditions are established. For the sake of maximizing the density of the propellants and hence reducing the size of the vehicle tanks, the pressures and temperatures are kept as low as possible within the tanks. These vent valves are thus precision cryogenic regulators that are complex, costly and heavy.

While on the ground, loads imparted to the vehicle are quite low, and the stiffening effects of the low internal pressures controlled by vent valves are sufficient to maintain structural integrity of the vehicle. However, during the ascent phase of flight and also prior to operation of the upper stage engines, the pressures within the vehicle tanks must be raised. In the case of ascent, the vehicle must be further stiffened so that it can survive the very high bending and compressive loads generated by aerodynamic, thrust and inertial effects. Pressures are raised prior to engine start to permit the proper operation of the engine pumps. These high capacity pumps must receive propellants whose pressure is substantially above their saturation pressure. This saturation pressure was effectively set prior to liftoff by the valving controlling tank pressures. Without system pressure maintained above saturation pressure, the propellants would boil within the pumps and they would cease to function properly. This margin is commonly referred to as Net Positive Suction Pressure (NPSP) and is commonly on the order of 3-10 psi.

In most modern upper stage vehicles, these pressurization demands are met by introducing gaseous helium into the ullage spaces of the propellant tanks. This helium is stored in separate vessels, typically at high pressure, and is delivered via valves to the propellant tanks at need. Helium is used since it has a low density, is chemically inert, and does not condense to a liquid at the cryogenic temperatures seen in the LO2 and LH2 tanks. Hence it can be used to pressurize both the LO2 and LH2 tanks with a tolerable mass penalty. Once the upper stage engines are operating, it is possible to perform the pressurization task by bleeding small amounts of warm H2 and O2 gases from the engine. This reduces the amount of helium required for the mission. The amount of helium required is thus dictated by the size of the propellant tanks, their pressure and the number of burns which are expected to be performed. The mass of the hardware required to contain this helium is very significant and many approaches have been taken to suppress system complexity and weight. However even the most advanced existing systems have strict limitations on their capabilities. These systems all have a limited amount of GHe and hence the number of engine burns, tank size, and other factors are all limited. Even a small leak of helium from the storage systems can result in a catastrophic loss of pressurant and hence mission failure.

During flight the upper stage propellant tanks will continue to absorb energy from the environment, albeit at a lower rate than what was present prior to launch. During engine burns, elevated tank pressures are maintained with GHe, gaseous O2 or H2 to establish and maintain sufficient NPSP and hence will end up at the end of a burn at a tank pressure above the saturation condition of the propellants. As heat is applied to the liquid propellants, they will gradually increase in temperature until their saturation pressure matches the partial pressure of H2 or O2 in the ullage gas. At this point, the propellants begin to boil. Tank pressures rise as the boil-off continues. If no action is taken prior to the next start of the engines, the system must be pressurized above this new higher pressure. The incremental increases in tank pressures therefore directly drive the peak operating pressures of the tanks, and hence their mass. Therefore, tank designs may have to account for much higher pressures, such as a 60 psia capability, which results in a substantial mass penalty.

To mitigate this pressure building effect on missions lasting more than a few minutes, it is common to vent the pressure in the ullage space to a level close to the original saturation pressure. Especially on the LH2 tank, during a mission to geostationary orbit, this venting may be performed multiple times. The energy absorbed from the environment is stored in the enthalpy of the ullage gases which therefore must be subsequently dumped overboard.

A significant limiting factor for all missions in space is accounting for the ullage losses associated with the continual boil off of cryogens. It is this propellant loss that has prevented to date the use of cryogenic propulsion systems for missions to the moon or indeed any mission with a duration that is much longer than one day. One of the most effective approaches for reducing losses is to apply a very low thrust to settle the propellants within the tanks to fixed locations, generally towards the aft end of their respective tanks. Less than a thousandth of one G is required to achieve this effect. Settling thrust segregates the liquid and gaseous phases of each propellant. Cold liquid propellant is thus physically separated from much warmer gas by the settling thrust. The quiescent gaseous ullage, in a microgravity environment without significant convection, then behaves as an excellent insulator and blocks heat from entering the liquid propellant surfaces. Heat is conducted down the side walls from the warm ullage side of the tank to the cold liquid side but this is inhibited by the relatively long conductive distances, reduced thermal conductivity due to the cryogenic operating temperatures and low wall thicknesses. Naturally the thinner these walls are the better. Thus it can be seen that a tank with a low gage and hence low allowable operating pressure is also thermally superior. All of these effects conspire to slow boil off when settling is imposed.

Settling thrust is typically provided by one or more small rockets fueled by hydrazine. On the Saturn S-IVB stage, the ullage gases were burned in a small thruster to maintain vehicle settling and some of the heat of the burning H2 and O2 was used to warm cold helium up for use in the pressurization system. Other vehicles such as the Delta Cryogenic Second Stage simply vent the boil-off gas aft to produce a small amount of settling thrust during long duration missions. Most often though, these waste ullage gases are simply dumped. Depending on vehicle design and mission duration, these wasted propellants can weigh into the hundreds of pounds. Naturally, the amount of time that a hydrazine system can support settling is strictly limited by the amount of propellant that it contains. Despite the best conservation efforts, hydrazine-based settling can at best be sustained for a handful of hours. Once settling is lost the surface tension effects within the propellants will gradually cause the interior of the propellant tanks to be fully wetted, temperature segregation will be lost and boil off rates can triple.

The vehicle must also provide a means for changing its attitude, and this function is also typically done with a hydrazine fueled thruster system. On the Centaur® vehicle, the attitude control thrusters and settling thrusters share a common supply system. While the settling function consumes the vast majority of hydrazine capacity, the attitude control task cannot be ignored. Settling thrusters can be commanded off, but the vehicle attitude must be stabilized for various reasons to include (i) maintaining radio links to the ground, (ii) providing an optimal attitude relative to the sun so that components such as avionics do not get too hot or cold, and (ii) suppressing heating of the main propellant tanks. Even if settling is eliminated, the attitude control function alone can consume hundreds of pounds of propellant over the course of a multiday mission. This propellant requirement is insupportable by most commercial upper stage launch vehicles.

Regarding the use of hydrazine as a propellant, while its application to space vehicles is widespread, there are a number of problems associated with its use. Hydrazine is a highly toxic, highly corrosive fluid that is compatible with only a handful of materials. Handling hydrazine requires hazardous procedure precautions, often requiring the use of positive-internal pressure inflatable SCAPE (Self Contained Atmospheric Protective Ensemble) suits to protect technicians loading a vehicle. Hydrazine can only be used in a narrow band of temperatures near room temperature. Hence, elaborate thermal control measures including heaters are mandatory, thus burdening the electrical storage system and exacerbating propellant heating. Hydrazine is also quite costly. Hydrazine is also a very inefficient fuel, delivering only a miserly specific impulse of 235 seconds. The advantages of Hydrazine are that as a fuel, it is simple and reliable to use assuming the appropriate environmental conditions can be maintained during its storage and delivery to a reaction chamber. Hydrazine is catalytically decomposed in a simple reaction chamber and does not require an ignition system or even an oxidizer. Nevertheless, the continued use of hydrazine sets harsh boundaries on improving overall vehicle operations and costs.

The electrical systems on the upper stage currently use large electrochemical batteries to provide power. This battery technology has evolved over decades to favor batteries of increasing power density and attendant sophistication. The desire to provide redundancy has doubled the storage demand. Even with the best modern technology, these batteries are extremely heavy, costly and can only supply enough power for less than a day's operation of a vehicle such as a Centaur®. Without a means to recharge these batteries, they set a strict limit on mission duration. Unfortunately the two common sources of power for recharge are solar panels and fuel cells, and these systems are both very costly to incorporate on a vehicle. Use of solar panels requires vehicle orientation control relative to the sun, and are physically bulky with complex deployment mechanisms. Most spacecraft that use solar panels are effectively in zero-G conditions, and hence large deployed solar panels are never exposed to high loads. A vehicle like Centaur® will generate acceleration forces in excess of 2 G's, and hence the mounting system for even a small solar array would be very heavy.

Fuel cells, while being more compact than batteries efficient and seemingly simple, are quite costly and complex to operate and support due to their intolerance of inert gases within the reactant streams and due to the necessity to dispose of the water they produce. To date, only manned vehicles such as the space shuttle can justify their cost and complexity.

While cost reduction, increased simplicity and reliability are primary goals in an improved vehicle, there is also an increasing need to expand mission capabilities beyond merely moving heavier payloads. Current missions are performed over a maximum flight duration of less than a day. However if the vehicle could efficiently fly for longer, it would be extremely valuable. Missions such as those to the moon require coast durations measured in days. The increasing amount of space junk in orbit will soon require the deliberate disposal of not only obsolete satellites but also the stages which placed them in orbit. This disposal activity at present would impose large performance penalties which would drastically increase the cost to orbit. However by performing disposal maneuvers at optimal times, this function can be accomplished with a minimum of cost. Missions such as space junk removal require a vehicle be capable of flying for days to weeks. In summary if one wishes to improve vehicle system performance and cost, yet expand the mission duration and improve reliability, a broader view of the vehicle must be taken to include a simultaneous analysis of vehicle thermodynamics, power, propellant and pressurant storage limitations, vehicle structural and thermal interactions, and the demands of widely varying missions. While it may be possible to redesign vehicle systems on a micro level, that is, to redesign selected systems based on specific mission requirements, this design approach inevitably compromises the majority of missions and can also create a proliferation of system designs that are all slightly different and likely incompatible. This micro level design solution is the origin of the present state of most space vehicle capabilities.

The use of waste ullage gas was recognized in the 1960's as a potential source of fuel for an auxiliary engine on the Saturn S-IVB. NASA recognized that these ullage gases could be captured and reused within an internal combustion engine that could be used to provide power for the upper stage vehicle. Although this recycling or reuse of the ullage gases was recognized development stalled with the proof of concept of a H2/O2 burning internal combustion engine. The concept was never flown.

There are a number of examples of improvements made to rocket propulsion systems in order to increase main engine propulsion efficiency, or to simplify the components of a launch vehicle, with one intent being increasing the available payload of the vehicle.

One example of such a reference is the U.S. Pat. No. 5,282,357 for a high-performance dual-mode integral propulsion system. This reference discloses a propulsion system in which pure hydrazine is used as the fuel for both a bi-propellant rocket engine for high thrust performance and in multiple mono-propellant thrusters for station keeping and attitude control functions. The use of the common fuel for both modes of operation significantly reduces propellant weight and inert propulsion system weight. For station keeping, the mono propellant thrusters can be augmented in performance by employing either electrothermal or additional direct chemical energy, arc jet operation, or force fuel acceleration to provide increased specific impulse values.

The U.S. Pat. No. 6,135,393 provides a spacecraft attitude and velocity control thruster system that incorporates monopropellant RCS thrusters for attitude control and bi-propellant scat thrusters for velocity control. Both sets of thrusters are designed to use the same liquid fuel, supplied by a pressurized non-pressure regulated tank, and operate in a blow down mode. In the propulsion system, such station keeping and attitude control thrusters may function in conjunction with a large thrust apogee kick engine that uses the same propellant fuel. Hydrazine and bi-nitrogen tetroxide are preferred as the fuel and oxidizer, respectfully.

Despite improvements in general rocket technology, to include increasing the efficiencies of rocket engines and components, there is still a need to provide even greater efficiencies, and to simplify space launch vehicle systems while carrying larger payloads over longer durations.

SUMMARY OF THE INVENTION

In accordance with the present invention, a system, methods and sub-systems or sub-combinations are provided to supply all required vehicle functions including attitude control, propellant settling, tank pressurization and venting, hardware actuation and purging and power generation without the need for any fluids other than the LO2 and LH2 present in the main vehicle tanks. The system thus has a capability to perform these functions without any limits other than the mass of the primary vehicle propellants. The overall system can be referred to as an integrated vehicle fluid (IVF) module that provides these functions. The waste or ullage gases from the hydrogen and oxygen tanks that are typically vented overboard, are used as the fuel and oxidizer to run a small internal combustion engine to provide power for all of the other vehicle functions. The power output shaft from the engine can be used to drive a number of secondary devices to include one or more generators that generate electrical energy for storage in one or more small batteries. Power from the shaft is also used in other secondary devices such as one or more pumps to modulate and regulate fluid pressures in the vehicle, to include most importantly, pressures in the $LO_2$ and $LH_2$ tanks.

The internal combustion engine (ICE) can be one of many selected types of engines to include a piston engine or a Wankel engine. This engine burns the gaseous hydrogen ($GH_2$) and gaseous oxygen ($GO_2$) from the upper stage propellant tanks. The $GH_2$ is introduced into the engine through a flow control valve that throttles the mass flow of the $GH_2$. Before the $GH_2$ enters the engine, the hydrogen is used to cool the exterior of the engine, maintain pressure in the crank case, and cool the internal chamber of the engine. The $GO_2$ is injected either into the hydrogen before or at the intake port or directly into the engine combustion chamber at an elevated pressure, similar to fuel injection in a diesel engine. In circumstances when the space vehicle requires additional power output from the engine, it is also contemplated that $LH_2$ can be mixed with the GH2 bled from the hydrogen tank to temporarily feed the engine. This additional cold fluid enables greater cooling capacity for the engine and increases the H2 density within the combustion chamber thus allowing more O2 to be introduced and hence more energy released. This mixing can be modulated by an intake control valve. Under most circumstances, however, the waste ullage hydrogen is all that is required to power the engine in order to provide sustained power for all upper stage systems.

In another important aspect of the invention, the exhaust from the internal combustion engine, composed primarily of high temperature hydrogen rich gas, is used to power one or more of the settling thrusters with a very high efficiency of thrust generation, as discussed further below. Therefore, the hydrogen ullage gas undergoes not only a single recycling use through the engine, but also an additional recycling use to power the settling thrusters.

The selection of a Wankel engine provides some advantages as compared to a traditional piston engine; however, either the piston engine or Wankel engine is contemplated for use in the present invention. As compared to a piston engine, a Wankel engine has no intake or exhaust valves, has fewer moving and lubricated parts, a very simple crank system, and is a very dynamically balanced engine due to its symmetrical disposition with respect to the movement of the rotor. Because of this simplicity the engine is very light. The three chamber configuration of the rotary engine has distinct hot and cold areas that can enable very simple gas cooling, yet may achieve higher exhaust gas temperatures that can be used as the exhaust gas for the settling thrusters. Regardless of the type of engine used, because of the limitations on combustion physics and materials, the engine preferably operates at a very low mixture ratio between 0.6 and 2. This range precisely matches the boil off characteristics of the vehicle which often generates more H2 than O2. Hence the engine more effectively uses the waste gases from the vehicle.

To accomplish all known vehicle functions requires a total shaft power of less than 10 kW and more commonly less than 2 kW. This allows the engine to be only moderately efficient and with a very small displacement on the order of 200 cc. High exhaust pressures can be tolerated by the engine, (such as in the range of 10-20 psia) which enables at least a 5-10 psia thruster chamber pressure in the settling thrusters by simply direct venting from the engine exhaust into the receiving chamber to the thrusters, without any further pressurization requirements. Settling thrust thereby generated is in the precise band to provide continuous low G forces. With respect to generation of electrical power, a very simple yet effective electric power generation is achieved by an electric starter/generator that is driven by the output shaft of the engine. The starter/generator generates electrical current for storage in a rechargeable battery. The starter/generator, associated electronics and the battery itself may also be cooled with hydrogen flowing through the IVF module. The battery can then provide electrical power for all the other upper stage systems, as well as power for pressurization pumps to pressurize the propellant tanks. The battery maintains a minimum charge and will discharge during peak loading conditions. The battery is easily recharged during vehicle coasts in which power loading is reduced since system duty cycle for lateral thrusters and pressurization is low during this period. By inclusion of the battery, this removes many restrictions on peak power and total available energy that were an inherent concern for prior space launch vehicles that solely relied upon battery power for many functions. The battery can be less than 5% of the capacity of present batteries with a proportional reduction in mass and volume. The drastic reduction enables the use of less exotic, lower power density battery designs without significant mass penalty but with large cost benefits.

The starter/generator permits the repeated startup and shutdown of the IC engine as required for ground testing and flight operations. If desired, the engine can be shut down for extended periods and all vehicle power provided by the vehicle battery. Settling can continue to be supported without the operation of the IC engine and hence low-boil off, settled thermodynamic conditions can be maintained for even longer periods. When the battery has been discharged to its low limit the IC engine can be restarted and the system loads transferred effectively to the generator which simultaneously recharges the battery. In its preferred embodiment the starter and generator functions are performed by a single electromechanical device.

In its preferred embodiment the IVF system performs the function of ground venting of the main propellant tanks via a ground vent valve. These valves are connected to the airborne system via disconnects which actuate once the vehicle has achieved liftoff. Because the ground valves are not restricted in mass, their regulation capability is far more precise and stable than a mass and volume restricted airborne valve. Their flow capacity is also far higher and hence higher heating rates or lower tank pressures can be readily accommodated. Since the high heating rates requiring these valves are not present during flight, the lower capacity airborne systems are used once the vehicle is placed in the vacuum of space.

One important aspect of the invention is that the launch vehicle can operate for long settled periods with thrust supplied only from the ullage gases. This sustained vehicle settling drastically reduces propellant losses in the tanks. Empirical testing has shown that boil off can be reduced to less than a third of normal losses. Unlike hydrazine based systems, this settling capability is generated by fluids that would typically have been merely dumped.

The present invention provides multiple levels and sources of settling thrust and integrates the airborne main tank vent function into the settling thrusters. Ultra-low forces can be generated by simply venting cold GH2 gases though the settling thruster. This also accomplishes the venting of the main LH2 tank during flight described in the background. Because this is accomplished with multiple axial thrusters, the vent rate can be modulated and there are redundant valves to enable this critical function. Thus a rapid tank vent can be accomplished without the need for dedicated vent valves as is the requirement with presently known vehicles. These vent events produce axial thrust which helps further settle the vehicle, and by modulating the axial thrusters, the vehicle attitude can be maintained by the guidance system. The need for precisely balanced vent systems as required in known vehicles is thus eliminated.

Although a rapid tank vent can be commanded, it may be more effective to simply burn off the excess gas in the ullage. Low thrust for sustained coast settling, (such as in the range between about 0.5. to 2 lbf) may be provided directly by the hydrogen rich ICE exhaust gas fed to the axial thrusters. Since the hydrogen fed to the ICE is supplied by the vented tank ullage, this venting gradually consumes the H2 ullage gas which would have to be vented in any event to reduce tank pressure. Combinations of direct H2 tank vent and ICE hydrogen burn off can be executed as required by mission needs, external heating requirements, or power demands. In nearly every case except direct venting of cold gas, the specific impulse of these settling thrusters are at least 50% higher than for existing hydrazine thrusters thereby providing a powerful performance enhancement.

Greater thrust and gradual LO2 tank vent down is obtained from the axial thrusters by adding GO2 to the ICE exhaust gases at the axial thrusters or in the exhaust lines leading to them thereby increasing the energy release. By adding GO2 to the ICE exhaust, a demand for GO2 is created from the accumulator which during a coast phase is replenished from the LO2 tank ullage. Thus in addition to direct venting of the LO2 tank through an axial thruster, excess GO2 is effectively burned off via the axial settler The highest axial thrust (4-25 lbf) and simultaneous LH2 and LO2 tank vent down is obtained by adding further GH2 from the ullage to the ICE exhaust stream as well as adding GO2. This mode is effectively the highest rate of tank venting while generating peak axial thrust. This mode is used during the highest settling demand periods immediately prior to and after main engine operation.

The ability to allow tank pressures to be reduced while taking full advantage of the vented gas allows us to efficiently re-saturate the liquid propellants at lower pressures. Since tank pressures are not allowed to rise uncontrolled, design pressures can be reduced on the vehicle main tanks. As described, this design pressure reduction has a profound positive effect on vehicle tank mass and its overall thermal efficiency. Both of these factors amplify the performance benefits of the IVF system.

The lateral thrusters are supplied from small accumulators which are held by a control system at a low pressure (approximately 200-500 psia) and near-ambient temperature. These thrusters burn H2 and O2 at a moderate mixture ratio between 1 and 4. The inlet mixture ratio is bounded by the temperature and pressure limits imposed on the storage accumulators. Because of this the high performance inherent (a specific impulse in excess of 350 seconds) in a H2/O2 thruster is obtained without need to bring cryogenic liquids and maintain them in thermodynamic stasis at each thruster inlet valve. In addition the seals, seats and other soft goods are not exposed to cryogenic conditions and hence are simpler, more reliable and less prone to leakage. Regenerative cooling of the thruster combustion chamber enables the total deletion of high temperature alloys and complex assembly methods from the thruster.

The lateral thrusters can operate in two modes. The first is the standard combustion mode whereby H2 and O2 are ignited within the thruster to produce on the order of 10-35 lbf of thrust. In each axis there are twin redundant thrusters so two levels of force are immediately available. The thrusters can also be operated in cold gas mode by only commanding a H2 inlet valve open. This provides a capability to produce very small impulses using a low-temperature and non-condensable exhaust. Precision vehicle maneuver in close proximity to other vehicles becomes straightforward without the threat of high temperature plumes either damaging or contaminating sensitive radiation shielding or other elements of the vehicle being docked.

The IVF module includes two small accumulators for containing GO2 and GH2. These accumulators are periodically replenished from either the gaseous ullage or from the liquid propellants in the vehicle tanks. Whenever the main upper stage engines are operating, GH2 and/or LO2 can be bled from the main engine pumps. During coast phases when the engines are not operating low pressure fluids from the main propellant tanks (either gaseous or liquid) are pumped up to an accumulator pressure of between 200 and 500 psia with small pumps which are driven through clutches or via electric motors by the internal combustion engine. Fluids exiting the main engine bleeds or the IVF pumps may be quite cold and might require warming prior to storage in the accumulators. This is accomplished by warming them in heat exchangers which are part of the exhaust system of the internal combustion engine and the downstream axial thrusters. The temperature of these gases is controlled by either simple mechanical thermostatic devices or via sensors and active computer control. These control devices modulate the amount of heat which is added to the cold gases exiting the pumps to achieve a steady temperature of gas delivered to the accumulators. Gases stored in the accumulators are thus stabilized within a narrow pressure and temperature band which is close to room temperature.

During low duty cycle periods the accumulators are replenished via the IVF pumps using ullage gas. This is typical of coast periods of a mission when the main engines are not operating and tank pressurization events are not occurring. This enables the best use of the waste boil off gases. Compression of gases though requires a larger expenditure of energy by the IC engine due to the larger enthalpy change associated with gaseous compression. This limits the total mass flow which can be supported by ullage gas compression. When ullage gases are flowing through the pumps, the need for heat addition from the IC engine exhaust and axial thrusters is low since much heating is accomplished simply by the heat of compression added in the IVF pump.

For high duty cycle periods when rapid and simultaneous pressurization of both hydrogen and oxygen tanks is required along with high settling thrust, the pumps consume liquid cryogens which are more efficient to compress and raise to accumulator pressure. These liquid cryogens require more heat addition from the axial thrusters but far larger mass flows can be supported by the IC engine power output. The use of liquid cryogens of course debits the vehicle main propellants and decreases the amount of LH2 and LO2 available to the main engines. The amount of liquid cryogens thus consumed however is compensated by the elimination of dry mass, hydrazine and helium from the vehicle. Effectively, these liquid propellants are converted to gaseous pressurants which are then later reused to generate power, settling and axial thrust.

The stabilization of the accumulator pressure and temperature simplifies the design of downstream devices such as the thrusters and pressurization valves. The thrusters can be operated with a narrow range of mixture ratios and thrust output since the inlet conditions are bounded. Similarly the pressurization valves can be sized to address only a restricted inlet density band unlike the situation with typical existing systems where valves must be capable of throttling inlet gases with a pressure band in the thousands of psi and temperature swings in the hundreds of degrees. The near-ambient storage conditions in the accumulators also enable the use of elastomeric and other materials in the construction of downstream valves and components. The combination of low pressure and ambient temperatures enables leakage of hydrogen and oxygen to be minimized with simple and reliable seats. The necessity for specialized, low-rate and hence costly cryogenic components is thus eliminated.

The oxygen and hydrogen pumps for the IVF module are extremely small with displacements typically on the order of 1-10 cc. The pumps can either be driven with mechanical clutches off of the internal combustion engine shaft or be driven by motors supplied with electricity from the starter/generator. The pumps are commanded by the IVF controller to turn on whenever their respective accumulator reaches its low pressure limit or can be directly commanded whenever significant fluid loads are imminent.

In a fashion similar to the thrusters, each module contains valves whose function is to deliver warm GO2 and GH2 to the respective main propellant tank ullages for tank pressurization. These gases are bled from the IVF accumulators at need, typically immediately prior to upper stage engine start and during engine operation but also during booster ascent. The lines leading to the main tanks for pressurization are in one embodiment separate from the vent lines leading from those same ullage spaces to the intakes of the pumps and internal combustion engine. This prevents the ingestion of warm, high pressure gas into these devices which are optimized to induct the colder, lower pressure gas resident in the ullage spaces.

The mass of the ullage gases which remain inside the vehicle at the completion of the mission are also dramatically reduced by the IVF module. The hydrogen tank, now pressurized with warm H2 from the accumulators, will have approximately half the mass as would be encountered in prior systems. This is due to the elimination of GHe (a heavier molecule than H2), the overall warmer temperature of the ullage, plus the reduction in the peak pressure required. The GO2 ullage is also considerably lighter due to the increased temperature and decreased pressure.

The IVF system also can supply gaseous H2 and O2 to actuate valves on the main vehicle and main engines. The propellant flow control systems on the vehicle are often actuated by medium pressure gaseous helium (GHe). Typically this gas enters into a piston in cylinder arrangement and the supplied pressure forces the piston to move which then actuates a ball, butterfly or poppet valve. The GHe is trapped in a dead-headed cavity adjacent to extremely cold liquid propellants. The gradual cooling of this actuation gas can adversely affect the opening and closing characteristics of the cryogenic valve. Venting the GHe causes the valve to then close. With the elimination of GHe from the vehicle, the IVF system provides either gaseous H2 or O2 as a replacement. Unlike in a GHe supplied system where the amount of gas is strictly limited, an IVF based system enables the actuation gas to be flowed through the valve actuator so that the temperature conditions within the valve actuation cavity remain stable over extended durations. The performance of the valve can be stabilized and control improved.

The IVF system can supply either one way or recirculating purges of either GH2 or GO2 to either prevent the ingress of external atmosphere into components on the vehicle, maintain stable temperature conditions at sensors or to thermally condition components such as avionics boxes, actuators, or to provide vapor cooling of structures. Vapor cooling is a technique whereby heat is blocked from moving down a structure by intercepting it with cold gas. Such techniques can drastically reduce heating in the main vehicle tanks and further extend flight operations by suppressing boil off.

While the IVF system takes advantage of the internal combustion engine to provide electrical power for vehicle systems and for the operation of the IVF pumps, this is not the boundary of what can be done with the power produced. The nature of the IVF system is that it taps at most 25% of the total power which is available from the engine. The shaft power can used for any function in the nature of an auxiliary power unit. It can circulate fluids for cooling or hydraulic power and can drive much larger pumps than those described for the internal IVF use. Large boost pumps which raise the pressure of propellants entering the main engines can be directly driven by the IVF engine and such pumps can also be used to circulate propellants within the vehicle or between docked vehicles. Boost pumps can further minimize or eliminate the need for direct tank pressurization since they provide the main engine's required NPSP by direct application of work to the fluid. The electrical generation system can be augmented with multiple generators including those for higher voltage which supports the use of multiple or higher power electromechanical actuators for driving engine thrust vectoring or other uses. The IVF engine can be used on an intermittent basis in concert with solar power or fuel cell systems. These systems can be sized for average loads but the IVF engine can be activated when peak demands are expected such as prior to and during main engine burns. In this way these other systems can be reduced in mass and cost with an overall benefit to system performance.

Moreover, the entire IVF system can be placed in a safe condition and vented of gases if it is not needed. This is a common requirement for rendezvous and docking with crewed space stations. Unlike a hydrazine system which can at best isolate the remaining propellant with pyrotechnic valves, the IVF can dump the accumulators and render itself completely inert. The possibility of inadvertent operation of a thruster or engine is thus completely eliminated.

In a preferred embodiment, a modular design is provided for the integrated fluid system. More specifically all elements are mounted to a single common panel and share a single set of fluids and electronic interfaces to the main vehicle. The module in one embodiment would contain two opposing pairs of pitch thrusters, one pair of yaw thrusters, and a pair of axial or vehicle settling thrusters. The accumulators, being quite small, can be closely coupled to the thrusters and also the pressurization control valves with a minimum of intervening plumbing thus minimizing leak sources and component count. The internal combustion engine, starter/generator and all electronic controls can share a common radiation enclosure which enables thermal stabilization of the components in space within a band near room temperature. The combination of all these masses on a rigid, shock and vibration isolated panel suppresses the movement of vibration energy both to and from the module. The module can be completely inspected and validated prior to installation on the vehicle. In the event of a fault after installation, it can be readily removed and replaced as a unit. In the preferred embodiment, the module can be mounted on existing available space on the aft deck of the vehicle and because of its small size, no modifications are required to the existing vehicle.

In one embodiment two modules are required per vehicle to provide the requisite redundancy and performance margins. The configuration of thrusters is such that the thrusters within the two modules work in concert to achieve the proper roll, pitch and yaw maneuvers. Because the two modules are interconnected they can preserve overall system function even if a single or multiple components on one module are inoperative. For example the GO2 pump on one module can act to supply the oxygen to the thrusters on the other module and vice versa.

In accordance with methods of the invention, a number of functions are provided within an integrated fluid design. The methods provide various functions to include production of mechanical energy by an internal combustion engine that has an output shaft, and the generation of electrical power through an electrical starter/generator that communicates with the shaft of the engine. Electric current from the alternator may be stored in a battery.

Another function is sustained vehicle settling to drastically reduce propellant losses in the upper stage propellant tanks.

Another function includes a modular design for a plurality of thrusters that utilize waste ullage gas, the thrusters being arranged for both attitude and settling capabilities. The thrusters may utilize the hydrogen rich exhaust gas from the internal combustion engine or may be traditional combustion-type thrusters that burn the H2 and O2.

Another function includes propellant tank pressurization control by hydrogen and oxygen accumulators that are pressurized, and have pressurization lines routing back to the tanks to maintain the tanks at desired pressurization levels.

Another function is the replenishment of gases in the accumulators by the periodic flow of both waste gases in the ullage or by vaporizing liquid propellants via small pumps Various other features and advantages of the system and methods will become apparent from review of the following detailed description, taken in conjunction with the drawings.

DETAILED DESCRIPTION

Figure 1:
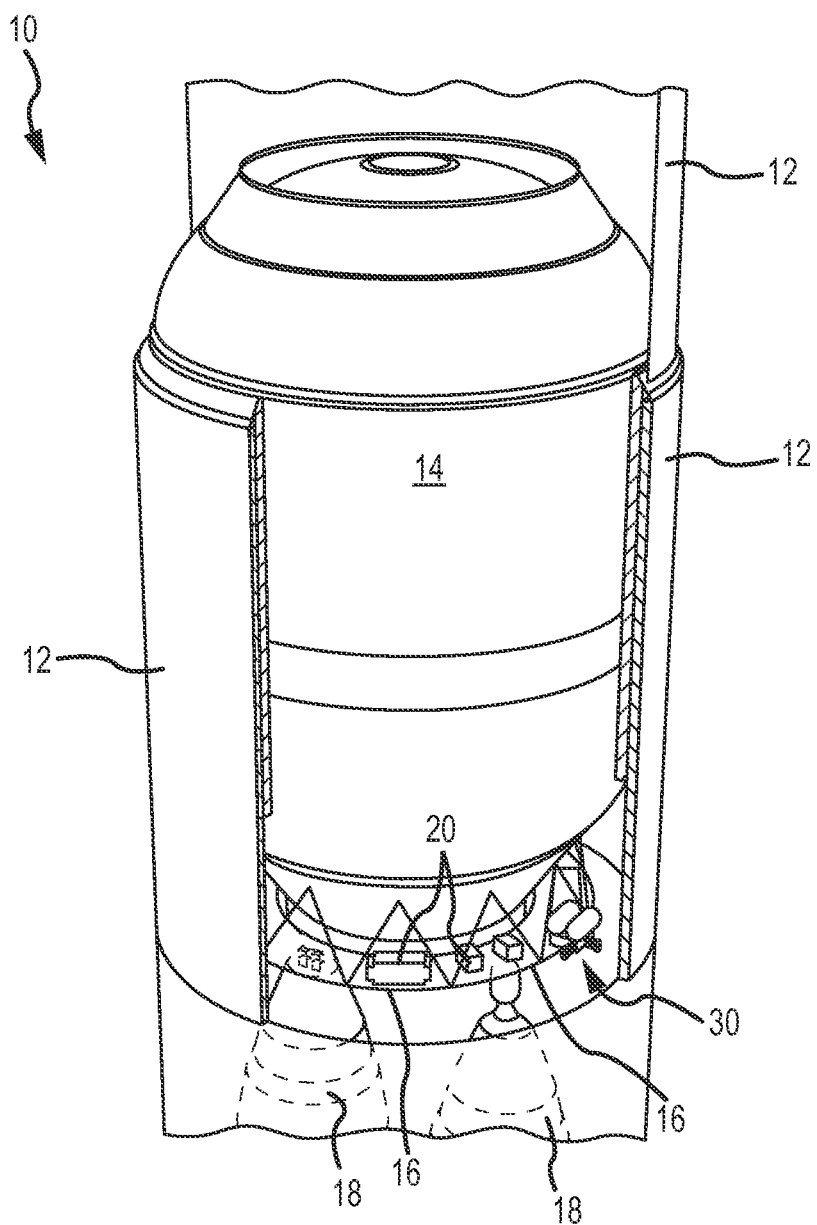
FIG. 1 is a fragmentary perspective view of part of an upper stage of a space launch vehicle illustrating an IVF module mounted to the aft deck of the upper stage.

FIG. 1 illustrates the upper stage 10 of a space launch vehicle. The outer covering or shell 12 is broken away to view the propellant tanks 14, which comprise the liquid hydrogen tank 60 and the liquid oxygen tank 62 with a common bulkhead separating the tanks. The aft of the vehicle includes a circumferential deck 16 that provides for mounting of various system components 20 such as avionics, fluid and mechanical devices as well as the IVF module 30 of the present invention. FIG. 1 also illustrates the main propulsion rockets 18 that are used to propel the upper stage 10. In the Figure, the relatively small size of the IVF module 30 is shown. Preferably, there is an IVF module mounted on opposite sides of the aft deck 16. Twin IVF modules are able to generate more than enough power to supply all of the upper stage system requirements, yet reduce overall vehicle weight by eliminating much of the wiring harness mass associated with traditional vehicles that use battery power. The elevated DC voltages that can be provided by the battery of an IVF module is also valuable for reducing EMA actuator mass. The particular vehicle 10 illustrated is a conceptual 41 ton propellant capacity upper stage. However, the IVF module of the present invention can be used with any type of upper stage vehicle that has at least some minimal space for mounting of exterior components.

Figure 2:
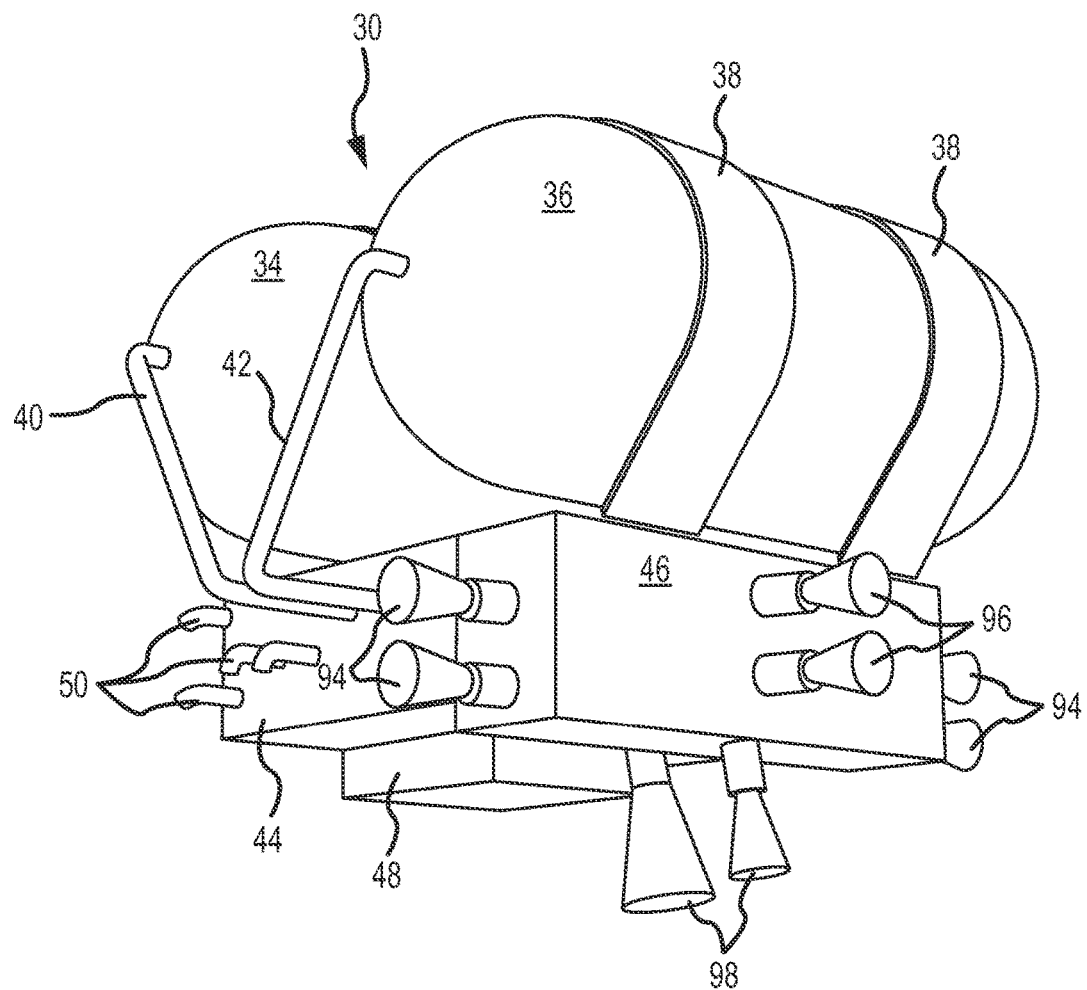
FIG. 2 is an enlarged perspective view of the IVF module.

Referring to FIG. 2, an example is provided for an IVF module design. In this Figure, major structural components of the IVF module are illustrated to include a $GO_2$ accumulator 34, a $GH_2$ accumulator 36, and mounting straps 38 that can be used to mount the accumulators to a frame of the module. Lines 40 and 42 communicate with the accumulators 34 and 36, and represent either vent, purge, or pressurization lines associated with the accumulators. A housing 44 is provided for the internal combustion engine (not shown), and a plurality of various other gas/liquid lines 50 are shown protruding from the frame for delivering gas or liquid throughout the system. A thruster group or assembly 46 is illustrated as another component of the module having a plurality of thrusters for settling and attitude control of the upper stage. As shown, the thruster assembly 46 includes a pair of axial thrusters 98, two pairs of opposing pitch thrusters 94, and a pair of yaw thrusters 96. A vehicle battery 48 is also illustrated and is secured to the IVF module, the battery 48 being charged by a generator connected to the output shaft of the ICE as discussed below.

Figure 3:
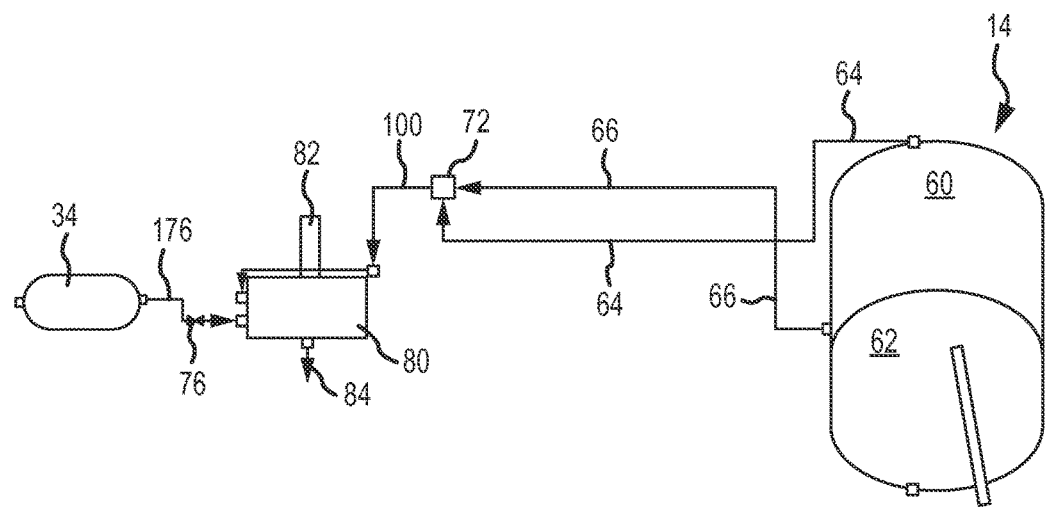
FIG. 3 is a schematic diagram illustrating one aspect of the invention, namely, the provision of an internal combustion engine in the IVF system to produce mechanical power.

FIG. 3 illustrates one aspect or concept of the present invention, namely, the provision of a small internal combustion engine (ICE) 80 that is used to provide power for the upper stage systems. In a preferred embodiment, the size of the ICE 80 is approximately 200 cc, and runs at a preferred mixture ratio between 0.6 and 2.0. As shown in the Figure, ICE 80 receives its $GH_2$ fuel from the liquid hydrogen tank 60 by vent line 64. The oxidizer, $GO_2$, is provided by an oxygen accumulator 34, through line 176, and metered through valve 76. The hydrogen vent line 64 communicates with a hydrogen intake mixture valve 72 that modulates the amount of hydrogen provided to the ICE. Depending upon demand, the ICE can also receive hydrogen through a dedicated hydrogen bleed line 66 that provides liquid hydrogen to the intake mixture valve 72. The metered amount of hydrogen is then combusted with the oxygen within the ICE, thereby producing a mechanical output shown as shaft 82. The exhaust gas from the ICE 80 is captured in exhaust line 84 that can be used for powering the axial thrusters as discussed below. The hydrogen vent line 64 would typically be used to dispose of waste ullage hydrogen gas. In the present invention; however, the waste ullage hydrogen is used to fuel the ICE. Optionally, the $GH_2$ carried by line 100 downstream of the valve 72 can be used to cool the engine exterior, maintain pressure in the crank case, and cool the internal rotor of the ICE.

Figure 4:
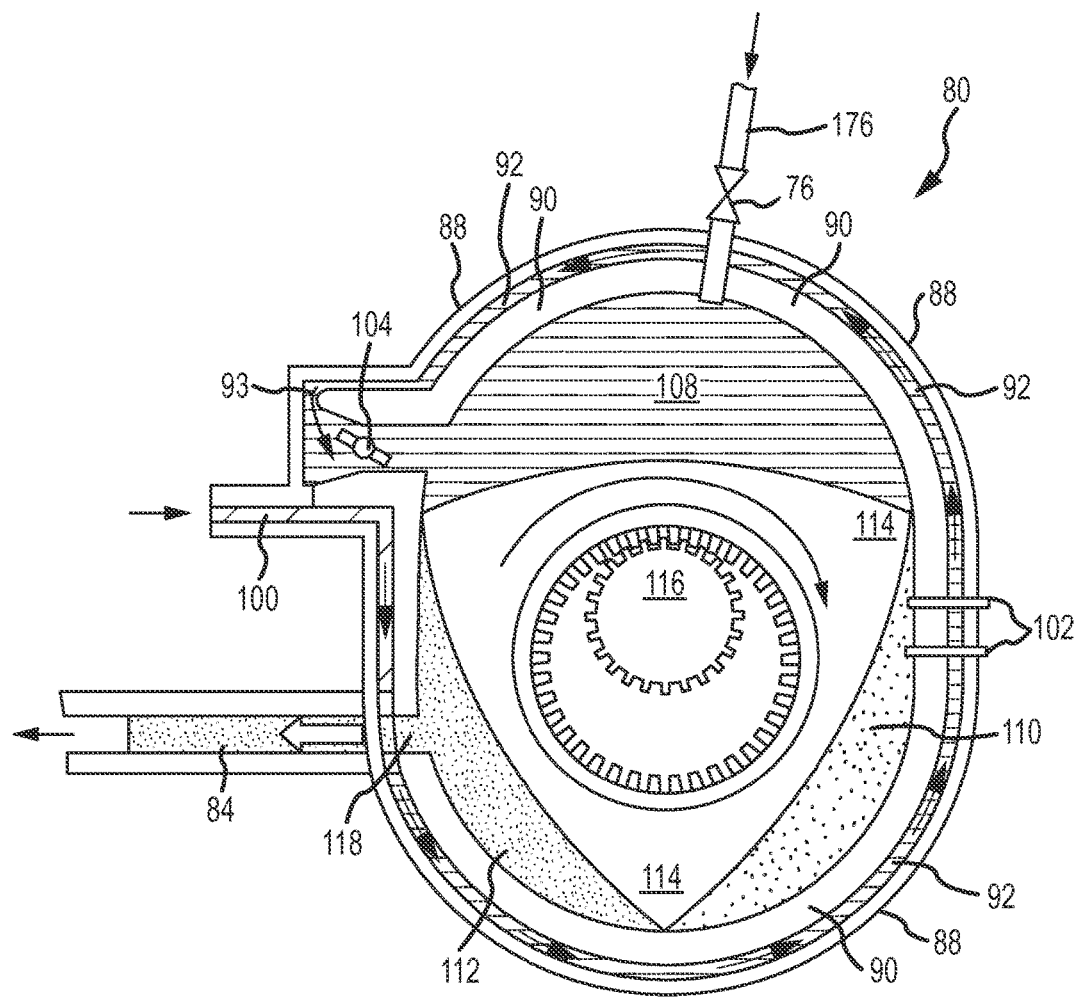
FIG. 4 is a cross-sectional schematic diagram of the ICE of the present invention, in the form of a Wankel engine.

Referring to FIG. 4 a particular construction is provided for the ICE 80 in the form of a Wankel engine. As illustrated, $GO_2$ is provided through line 176, while the $GH_2$ is provided through line 100 downstream of the intake mixture valve 72. The hydrogen is first circulated in a gap 92 between the engine block 90 and a cooling jacket 88. As the low pressure GH$_2$ is circulated, it warms by heat transfer from the block 90, and finally flows to the intake port 93. Valve 104 can be used to meter the GH$_2$ flowing into the ICE. Once inside the engine, the hydrogen first enters the fuel intake chamber 108. A solenoid injector valve 76 opens at the correct moment during the intake phase to inject the GO$_2$. This injector also prevents GO$_2$ back flowing into the GH$_2$ system, and also controls the engine mixture ratio. As the rotor 114 rotates about the eccentric shaft 116, the hydrogen and oxygen are then compressed with an area defined as the combustion chamber 110. Spark plugs 102 provide the source of ignition for igniting the fuel within the combustion chamber 110. The expansion of the gases in the combustion chamber provide the motive force for rotating the rotor 114, thus moving the combusted gas to the portion of the engine defined as the exhaust chamber 112. The high temperature, GH$_2$ rich and pressurized gas exits the exhaust port 118 into the exhaust line 84. Although one will appreciate the simple, yet effective design for a Wankel engine incorporated in the IVF system of the present invention, it shall be understood that a standard piston engine (not illustrated) can also be used as the ICE 80. The GO$_2$ and GH$_2$ are provided to the piston engine in the same manner as illustrated for the Wankel engine. More specifically, the GO$_2$ is provided through line 176, while the GH$_2$ is provided through line 100 downstream of the intake mixture valve 72. The hydrogen can be circulated in a gap between the engine block and cooling jacket of the piston engine. As the low pressure GH$_2$ is circulated, it warms by heat transfer from the block, and finally flows to a fuel intake port of the piston engine. Valve 104 can be used to meter the GH$_2$ flowing into the piston engine. Once inside the engine, the hydrogen is transferred to the cylinders. One or more injector valves can be used to inject the GO$_2$ into the cylinders for mixing with the GH$_2$. Spark plugs 102 provide the source of ignition for igniting the fuel within the cylinders. The expansion of the gases upon ignition provide the motive force for rotating a crankshaft of the piston engine, and the combusted gases are evacuated from the cylinders to the portion of the engine defined as the exhaust chamber 112. The high temperature, GH$_2$ rich and pressurized gas exits the exhaust port 118 into the exhaust line 84.

Figure 5:
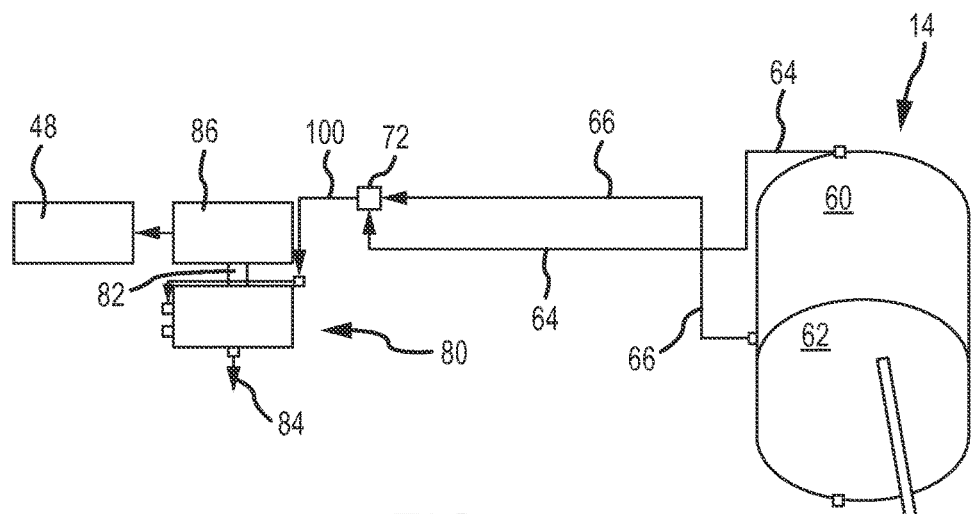
FIG. 5 is another schematic diagram for another aspect of the invention, namely, the provision of electrical power.

Referring to FIG. 5, in another aspect of the present invention, electrical power is provided by an electrical alternator 86 that is driven by the output shaft 82 powered by the ICE 80. The alternator 86 in turn provides electrical current for charging a battery 48. For IVF system pumping requirements to charge the accumulators as discussed below, power can be supplied either from the battery 48, or power can be provided by the output shaft 82 to a clutch (not shown) connected to the accumulator pumps. The clutch can be engaged and disengaged to operate the pumps. As the vehicle operates, the battery 48 will discharge during peak loading requirements, but will recharge during vehicle coasts, i.e., those times during which power demands are low. The use of a charged battery 48 removes previous restrictions on peak power and total available energy that was a problem with prior launch vehicle systems in which power was limited to only battery power.

Figure 6A:
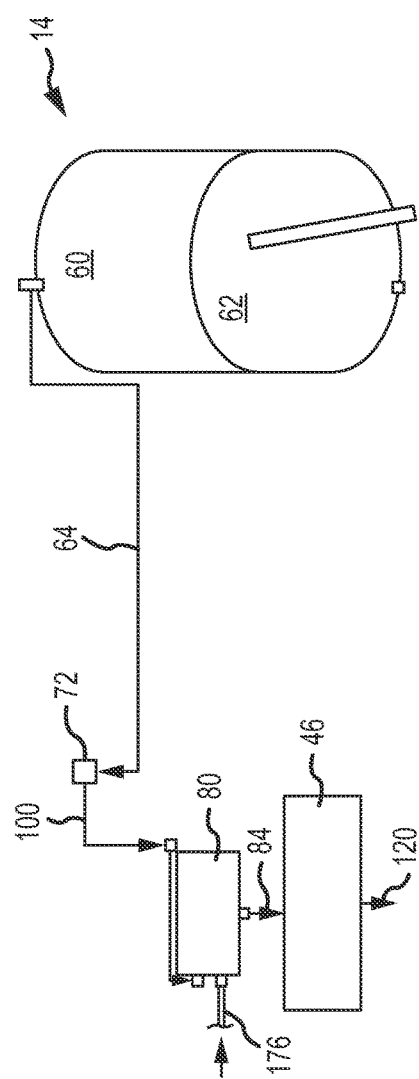
FIG. 6A is another schematic diagram illustrating yet another aspect of the invention, namely, provision of a thruster assembly for sustained vehicle settling using exhaust gas from the ICE.
Figure 6B:
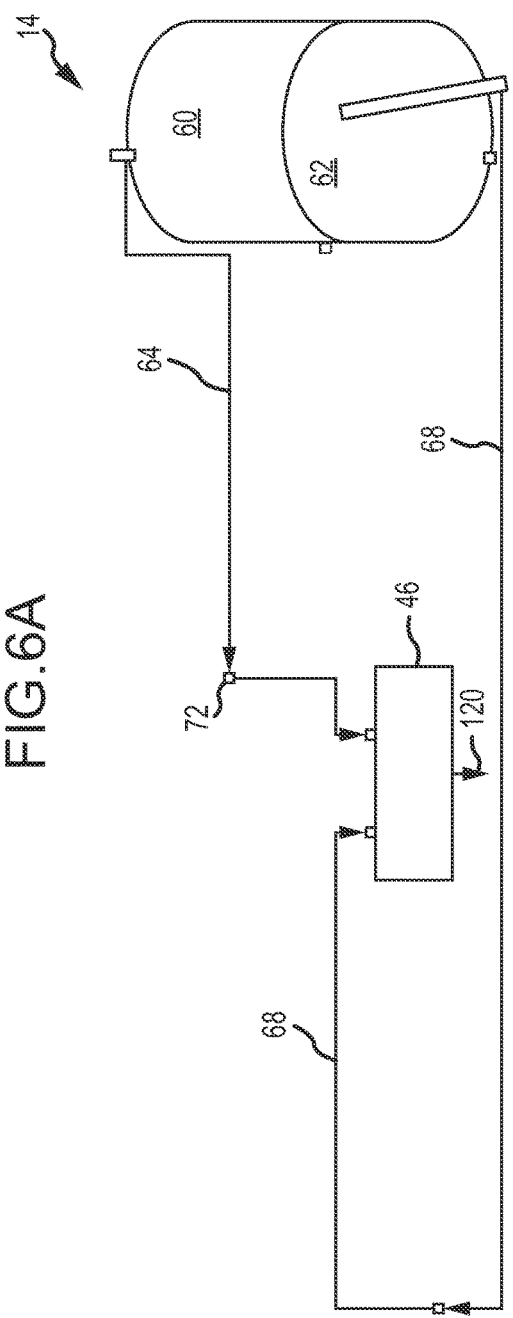
FIG. 6B is another schematic diagram for the aspect of FIG. 6A, but using ullage gases for powering the thruster assembly.

FIG. 6A is another schematic diagram illustrating another aspect of the invention, namely, sustained settling modes provided by the thruster assembly 46. The thruster assembly as mentioned includes a pair of axial thrusters 98 that provide settling thrust. For long duration, low thrust settling, the high temperature, high pressure exhaust 84 can be used directly from the ICE to generate thrust 120. However, the thrust 120 provided in this mode is limited by the peak mass flow through the engine and the allowable engine combustion temperature. Using the exhaust gas of the ICE is a very efficient method for sustained settling, since the ICE is normally operating to provide vehicle power and will rarely cease to operate for any extended period of time. Therefore, there is a constant flow of exhaust gas 84 that can be used for providing thrust. In another vehicle settling mode shown in FIG. 6B, settling thrust can be provided directly through the GH$_2$ ullage vent line 64 to the thruster assembly, with oxygen provided directly through the GO$_2$ ullage vent line 68. These ullage gases are then combined and combusted in combustion chamber of the thrusters. The ullage gases provide more than sufficient fuel and oxidation material for running the axial thrusters.

Figure 7:
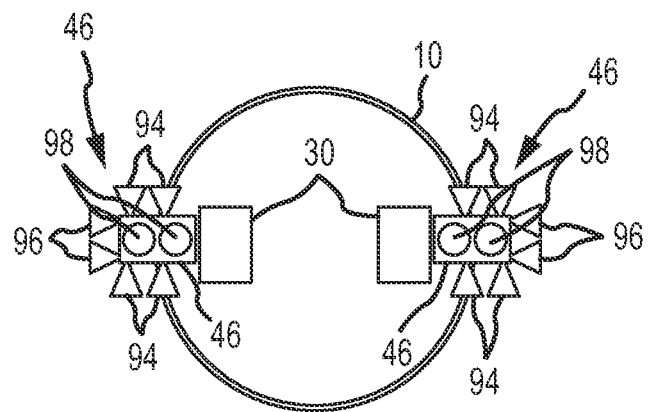
FIG. 7 is a simplified schematic diagram illustrating the port and starboard positioning of separate IVF modules for the upper stage of the vehicle.

Referring to FIG. 7, a schematic diagram is provided showing that a pair of IVF modules 30 is used, each having the same construction, and mounted to opposite sides of the vehicle 10 when looking at the vehicle outer diameter in schematic cross section. The IVF modules 30 are generally illustrated showing the thruster assemblies 46 having the pitch thrusters 94, yaw thrusters 96, and axial thrusters 98. The pair of IVF modules 30 provides redundancy without adding significant weight.

Figure 8:
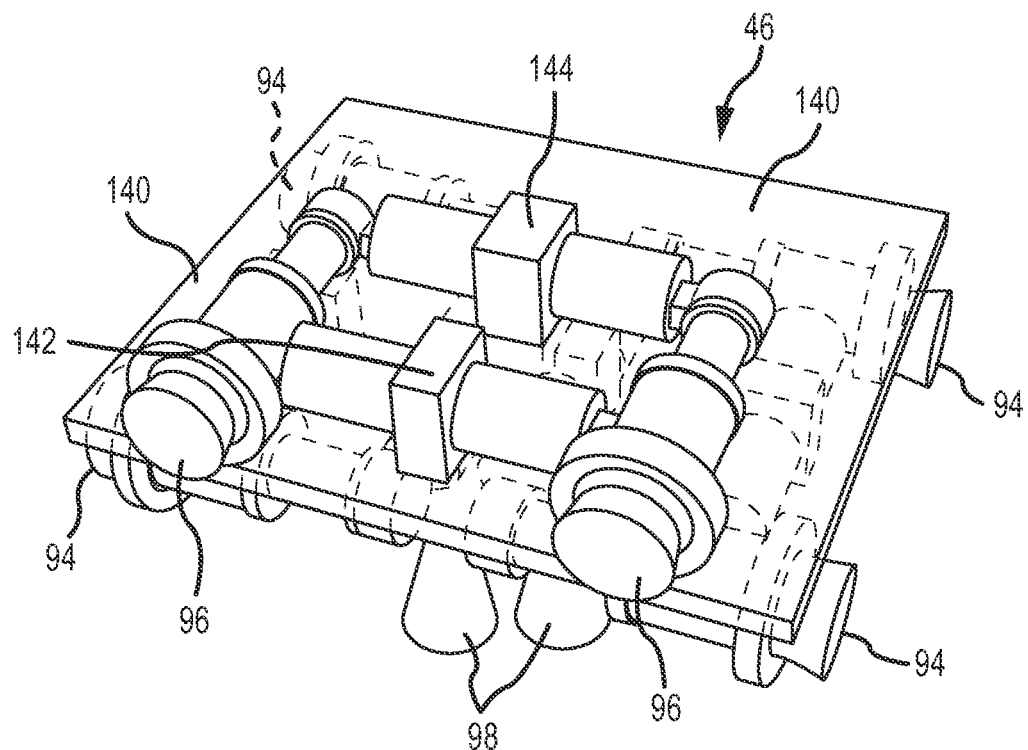
FIG. 8 is a perspective view of an example construction for a thruster assembly including a panel to which the thrusters may be mounted, along with hydrogen and oxygen manifolds for delivery fluids to the thrusters.

Referring to FIG. 8, an example is provided for a specific thruster assembly construction. Specifically, a panel 140 can be used to mount the yaw thrusters 96 on one side of the panel, while the two pairs of pitch thrusters 94 can be mounted on the other side of the panel 140. A hydrogen manifold 142 comprises a plurality of lines and fittings for carrying hydrogen to the thrusters, while an oxygen manifold 142 also comprises a plurality of lines and fittings for carrying oxygen to the thrusters. The axial thrusters 98 can also be mounted to the panel 140, or may be mounted to a separate panel. It is noted that the particular thruster panel assembly shown in the FIG. 8 can be modified to allow the thrusters to conveniently fit within the space available on the mounting structure of the space vehicle. As compared to in the FIG. 2, the FIG. 8 shows a different, yet functional arrangement for the thrusters.

Figure 9:
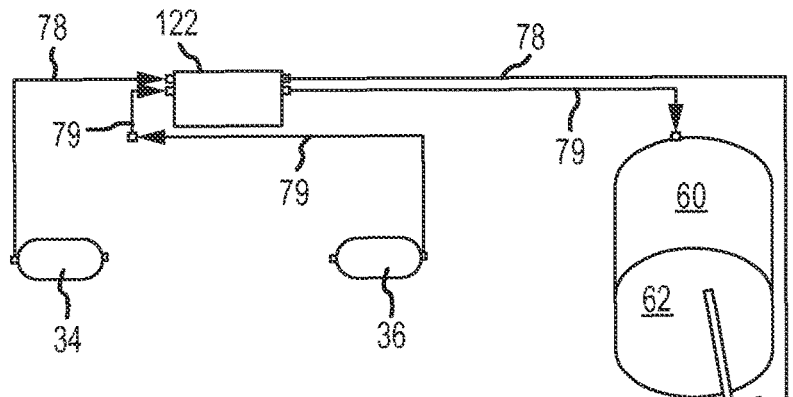
FIG. 9 is a schematic diagram illustrating another aspect of the invention, namely, tank pressurization and vent.

Referring to FIG. 9, yet another concept is illustrated with respect to the invention, namely, tank pressurization. As shown, both the LH$_2$ 60 and LO$_2$ tanks 62 have respective pressurization lines. Specifically, an oxygen pressurization line 78 pressurizes the oxygen tank 62, while the hydrogen pressurization line 79 pressurizes the hydrogen tank 60. The accumulators 34 and 36 are maintained at an adequate pressure, and the tank pressurization controls 122 monitor and adjust pressurization. In this model, the accumulators supply all of the pressurization required for the propellant tanks to operate.

Figure 10A:
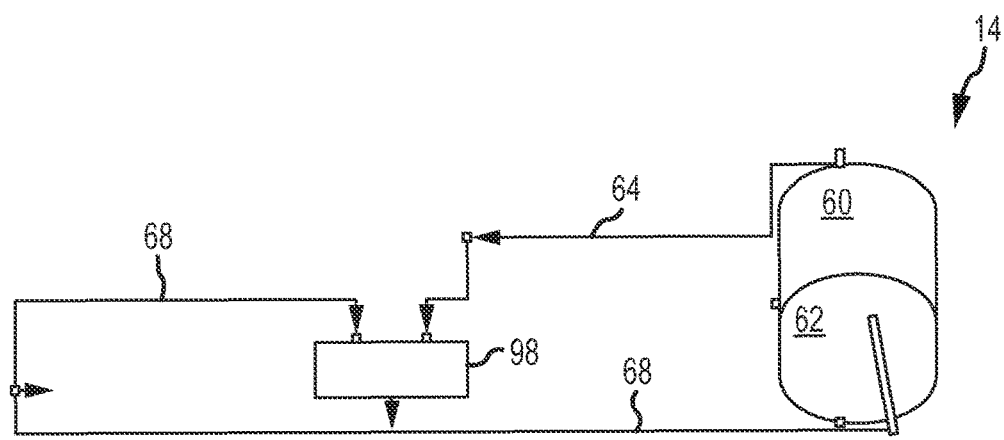
FIG. 10A is a schematic diagram illustrating another aspect of the invention, namely, venting the propellant tanks directly through the thrusters.
Figure 10B:
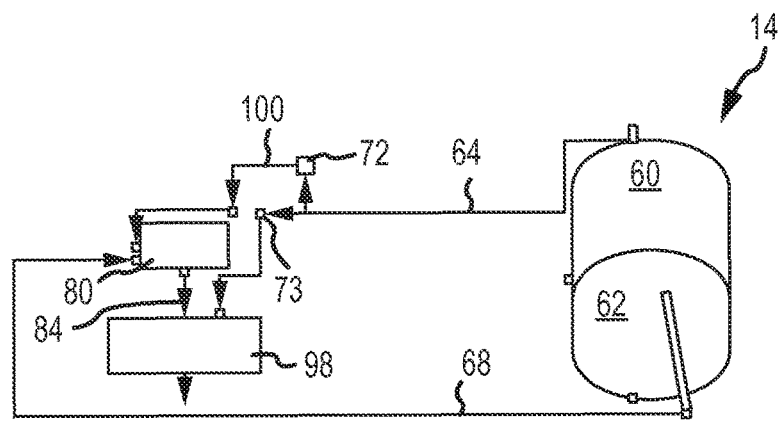
FIG. 10B is a schematic diagram illustrating the aspect of FIG. 10A, but venting through the ICE.

FIGS. 10A and 10AB illustrate yet another aspect of the invention, namely, tank venting. Referring to FIG. 10A in one tank venting mode, the propellant tanks can be directly vented through the axial thrusters 98. The ullage gases are combined and combusted in the axial thrusters. As shown, the GH$_2$ vent line 64 and GO$_2$ vent line 68 both connect to the axial thrusters. The high thrust forces that can be generated with use of the ullage gases in this manner are very valuable to prevent vehicle shutdown caused by slosh of the LO$_2$ and GH$_2$. This high thrust producing venting mode can be activated at any time to relieve pressure in the propellant tanks, as well as to provide on demand, additional thrust for settling and attitude control. Referring to FIG. 10B in a low flow venting mode, the GH$_2$ and the GO$_2$ demands from the ICE engine 80 are normally sufficient for relieving pressure in the propellant tanks to maintain them in optimal pressure conditions. The vent lines 64 and 68 provide the flow of GH$_2$ and GO2, respectively to the ICE 80. The operation of the ICE 80 in this low venting mode provides continuous settling of the vehicle, and suppresses heating within the tanks to prevent boil off of the propellants.

Figure 11:
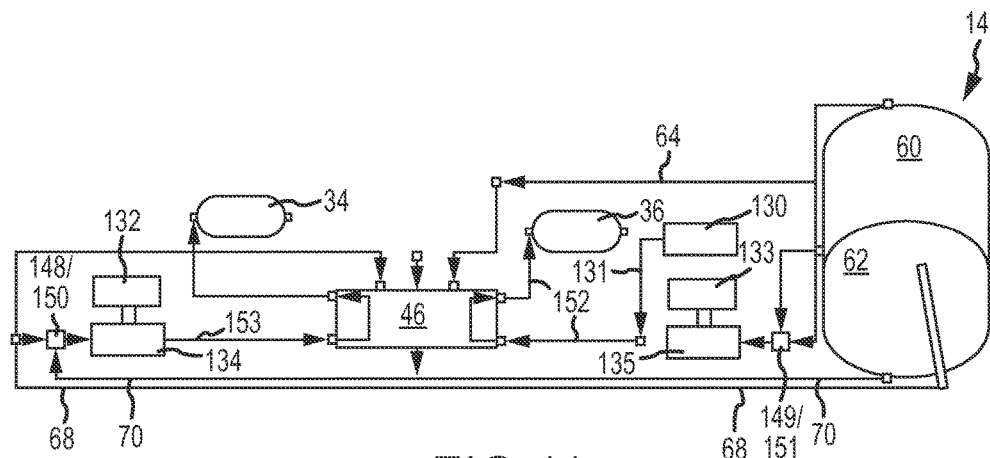
FIG. 11 is schematic diagram illustrating another aspect of the invention, namely, accumulator replenishment.

Now referring to FIG. 11, in accordance with another aspect or concept of the present invention, accumulator replenishment is illustrated. One fundamental concept of accumulator replenishment is that the accumulators 34 and 36 must be pressurized. Accordingly, pumps 134 and 135 are provided to pressurize the lines 153 and 152 that charge the accumulators 34 and 36, respectively. Drive motors 132 and 133 drive the pumps 134 and 135. The drive motors 132 and 133 may be powered by either the ICE 80, or may be electrically powered by the battery 48. A LO$_2$ bleed along with a GO$_2$ vent from tank 62 are controlled respectively by a liquid inlet valve 148 and ullage gas inlet valve 150. In the FIG. 11, these valves 148/150 are shown as a single block. These valves then meter the ullage gas or liquid oxygen through the pump 134 for ultimate delivery to the GO2 accumulator 34. The outlet line 153 from the pump 134 carries the ullage gas/liquid oxygen in a heat exchange relationship through the thruster group 46, functioning to extract heat as necessary from one or more of the thrusters in the assembly 46. The line 153 then carries the gaseous oxygen to the accumulator 34. The same arrangement is provided for hydrogen in which liquid hydrogen or GH$_2$ ullage are provided through the inlet control valves 149/151, the pump 135 delivers the liquid/gaseous oxygen through outlet line 152 and in a heat exchanger relationship with the thruster group 46. Line 152 then carries the gaseous hydrogen to the GH2 accumulator 36. In summary, the motor driven pumps pressurize the ullage or liquid up to the necessary accumulator pressures. Liquid compression enables high pressure requiring only low shaft power from the drive motors 132 and 133. Heat is selectively added as needed through the thruster group 46 to thereby deliver primarily GH2 and GO2 through the lines 152 and 153, as most LH$_2$ and LO$_2$ will boil when coming in contact with the thruster group 46.

Figure 12:
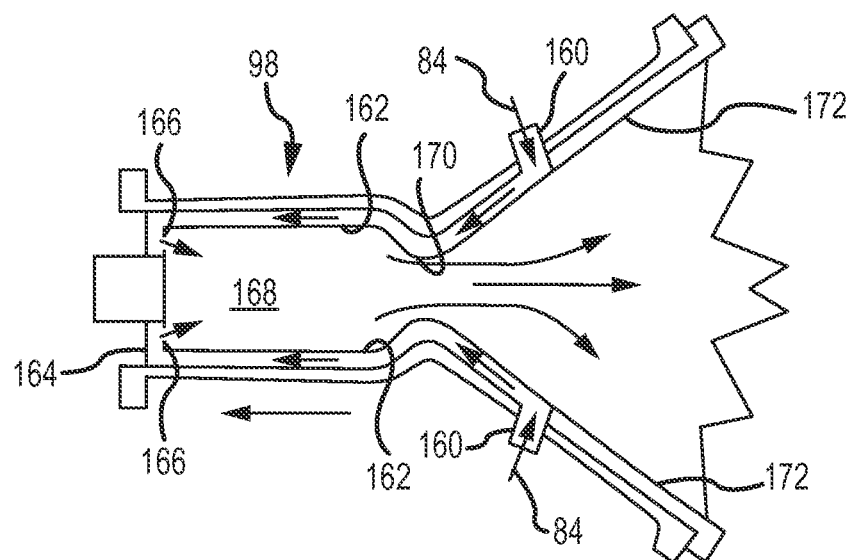
FIG. 12 is a schematic diagram of one type of axial thruster, namely, exhaust gas thrusting.
Figure 13:
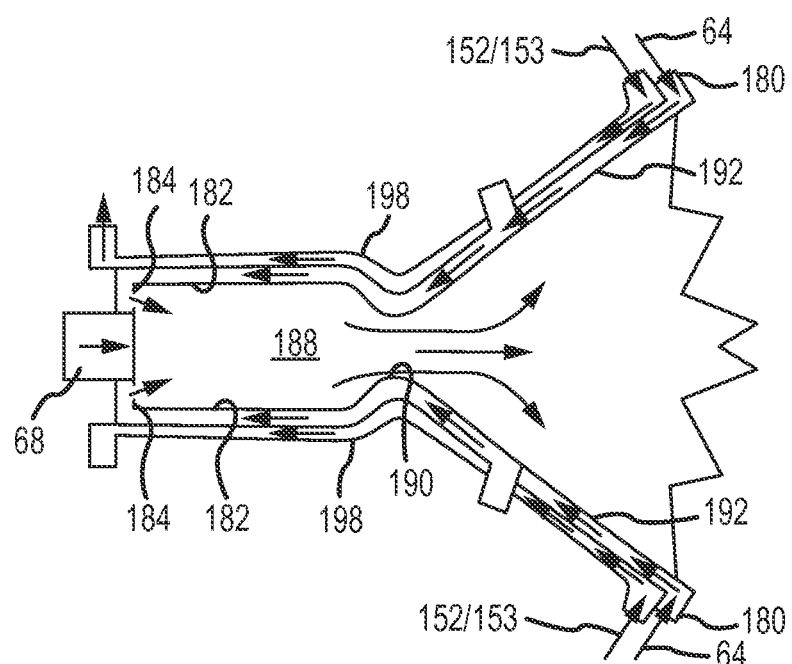
FIG. 13 is a schematic diagram of another type of axial thruster, namely, one that combusts $GH_2$ and $GO_2$.

Referring to FIGS. 12 and 13, in another aspect of the invention, different types of axial thrusters are illustrated. Referring first to FIG. 12, exhaust gas thrusting is illustrated. The exhaust 84 from the ICE 80 communicates with one or more inlet ports 160 of a thruster 98. The GH$_2$ rich exhaust gas at high temperature is then routed through internal passageways 162 of the thruster to the aft or rear end 164 of the thruster. At that point, the high temperature and pressurized gas is vented through one or more openings 168 into a first smaller chamber 168, through a nozzle or restriction 170, and then is allowed to expand within the cowl 172. The thrust is provided by the expanding gas as it passes through the nozzle 170 into the cowl 172. Therefore, efficient means are provided for axial thrusting by simply utilizing the exhaust gas from the ICE 80. Although the axial thruster 98 is illustrated, it is also contemplated that the exhaust gas 84 can be used to power any of the other thrusters.

Referring to FIG. 13, another type of thruster is illustrated in which ullage GH$_2$ is combined with ullage GO$_2$ and then combusted to create gas expansion and production of thrust. More specifically, one or more ullage gas inlets 180 are provided for receiving ullage GH$_2$, such as through vent line 64. Similarly, oxygen can be provided through GO$_2$ vent line 68. The GH$_2$ flows through passageways 182 to cool the thruster, and through openings 184 to join the GO$_2$ in the combustion chamber 188. An ignition source (not shown) ignites the GO$_2$ and GH$_2$, resulting in an expansion of gas through nozzle 190 into the cowl 192. FIG. 13 also shows the heat exchange that can occur with the liquid or gaseous propellants carried in the lines 152/153. As shown, a simple heat exchanger 198 is illustrated as a jacket that allows flow of the propellants over the exterior of the thruster to absorb heat from the thruster. The propellants are then carried downstream to the respective accumulators.

Figure 14:
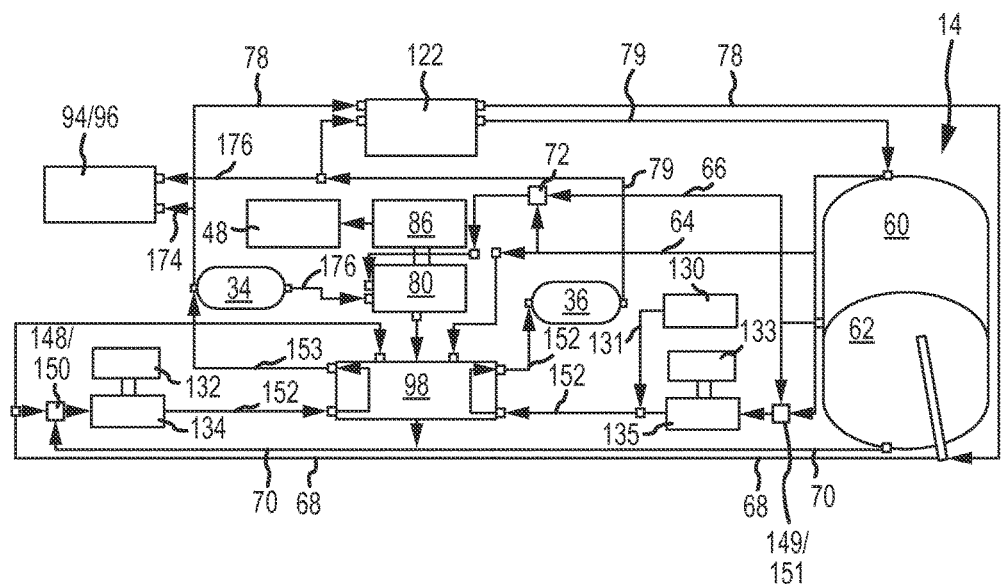
FIG. 14 is another schematic diagram illustrating basic functions of the IVF module.

Referring to FIG. 14, a system overview is provided showing the basic functions of the IVF system. In general, the IVF system provides functions to include attitude control, sustained settling, tank pressurization, and a power supply. The ICE 80 provides power for an alternator 86 to generate current to be stored by the battery 48. The ICE 80 can also provide power to the drive motors 132 and 133 for powering the oxygen and hydrogen pumps 134 and 135 in order to pressurize the accumulators 34 and 36. The accumulators store GO$_2$ and GH$_2$ at high pressures, and provide the source of high pressure to pressurize the propellant tanks. Tank pressurization controls 122 monitor and maintain the LH$_2$ tank 60 and LO$_2$ tank 62 at the proper pressures. The exhaust gas 84 from the ICE 80 can be used to drive the axial settling thrusters 98. Alternatively, ullage gas, supplemented with liquid hydrogen under peak demands, provides sustained settling thrust that greatly reduces losses in the tanks. The ICE 80 as well as the settling thrusters 98 can be cooled from the waste ullage gases by first passing the gases in a heat exchange relationship prior to combustion. The ICE 80 and the battery 48 work together to share power demands. Specifically, power boosts can be easily provided by changing the fuel mixture ratio for the ICE in order to either more quickly charge the battery 48 or to provide the necessary mechanical power for other vehicle systems.

Figure 15:
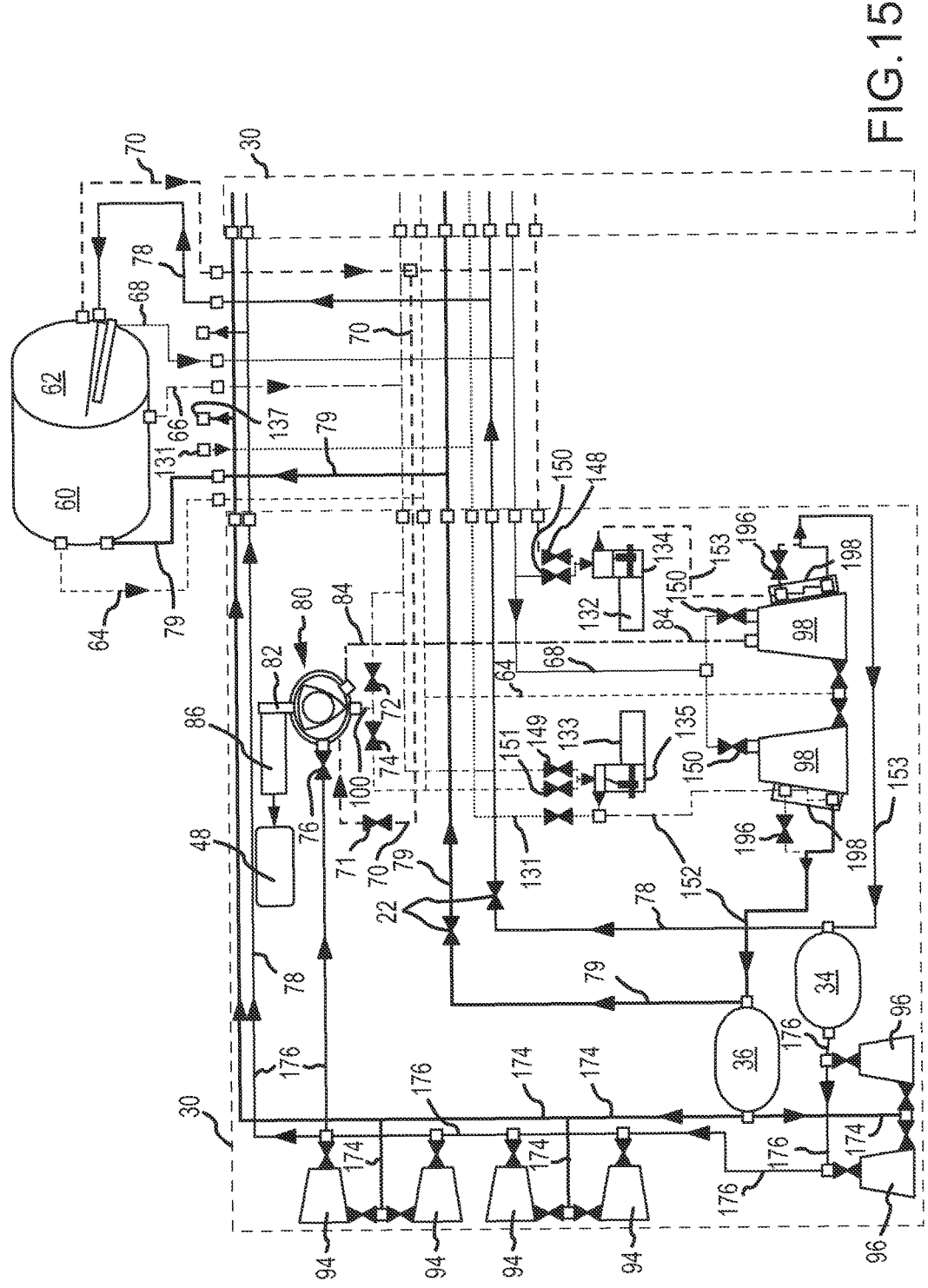
FIG. 15 is a system schematic illustrating the primary elements within the integrated fluid system and fluid connections between the elements in the system.

Referring to FIG. 15, a schematic system diagram is provided with a more detailed view of a plumbing schematic showing the system components and manner in which they are interconnected. More specifically, an IVF module 30 is shown with components, and the general piping connections between the components. The additional IVF module 30 shown on the right side of the diagram within the dotted lines has the same piping configuration as the fully illustrated IV module on the left side of the figure, but for clarity, the piping configuration is not shown for the right side IVF module.

Referring to the schematic diagram of FIG. 15, the various vent, purge, and bleed lines/elements are illustrated as they communicate with the propellant tanks. As also discussed in part with reference to the prior Figures, these vent, purge and bleed lines include hydrogen vent 64, hydrogen pressurization 79, GH$_2$ bleed 131, H$_2$ purge 137, LH$_2$ bleed 66, GO$_2$ vent 68, GO$_2$ pressurization 78, and LO$_2$ bleed 70.

For the axial thrusters 98, the schematic diagram shows the heat exchangers 198 that receive the pressurized gas/liquid through the lines 152/153 that are pressurized by the pumps 134 and 135. Bypass valves 196 allow the fluid/gas to be delivered directly to the accumulators without passing through the heat exchangers 198. As shown, only one of the axial thrusters 98 communicates with the exhaust line 84 for receiving the GH$_2$ rich heated gas, while both of the axial thrusters are shown as being capable of operating as combustion type thrusters in which lines carry the ullage GO$_2$ and GH$_2$ to the axial thrusters for combustion.

For the pitch and yaw thrusters, these are preferably combustion type thrusters, each receiving GH$_2$ and GO$_2$ from the accumulators as shown. Specifically, pitch thrusters 94 and yaw thrusters 96 receive GO$_2$ from line 176 that connects directly to the GO$_2$ accumulator 34, and thrusters 94 and 96 receive GH$_2$ fuel from lines 174 that connect directly to the GH$_2$ accumulator 36.

As also discussed previously, the combination of vent and bleed lines from the LH$_2$ and LO$_2$ tanks provide fuel and an oxidizer to the ICE 80 that produces power for the vehicle. FIG. 15 also shows a supplemental method of providing oxidizer to the ICE 80 by inducting oxygen directly into the ICE 80 from the LO$_2$ tank ullage instead of from the accumulator 34 and through the injector 76. Specifically, FIG. 15 shows the supplemental method by an extension of the LO$_2$ bleed line 70 that connects directly to another intake port of the ICE 80. A throttle valve 71 connected inline can be used to meter the LO$_2$ into the ICE 80 at a desired rate. One advantage of this supplemental method is that the ICE 80 can be operated without having to operate any system pumps.

The attitude and settling thrusters operate with combustion of the propellants, or at least one of the thrusters can produce thrust by using the exhaust gas from the ICE. The accumulators are pressurized, and control pressures in the propellant tanks. The IVF module is small, but can produce power and thrust to service all of the vehicles needs in these requirements.

While the present invention has been explained and illustrated with respect to various functional features or aspects in one or more preferred embodiments, it shall be understood that the invention can be modified, commensurate with the scope of the claims appended hereto. Further, it should be understood that each of the different concepts or aspects of the invention can be considered as having separate utility. Accordingly, the invention comprises a number of separate sub-combinations and combinations that have utility with respect to supporting the functions of an upper stage space vehicle.

What is claimed is:

1. An upper stage launch vehicle comprising:
   at least one main upper stage rocket for propelling the launch vehicle in space;
   a pair of main vehicle tanks for storage of liquid propellants therein including a hydrogen tank and an oxygen tank;
   an internal combustion engine powered by waste ullage hydrogen and oxygen vented from said tanks, said internal combustion engine having an output shaft;
   a power generator communicating with said output shaft of said internal combustion engine for generating electrical current;
   a battery in electrical communication with said generator for storing the electrical power;
   a gaseous oxygen accumulator for storing oxygen from the oxygen tank;
   a gaseous hydrogen accumulator for storing hydrogen from the hydrogen tank; and
   a plurality of thrusters to provide attitude and settling control of the vehicle, at least one of said plurality of thrusters being selectively powered by exhaust gas from the internal combustion engine, and at least one of said plurality of thrusters being selectively powered by oxygen and hydrogen gas from said accumulators.

2. A system, as claimed in claim 1, further including:
   pressurization lines from said accumulators to said tanks for pressurizing the tanks; and tank pressurization controls for selectively controlling the tank pressures.

3. A system, as claimed in claim 1, wherein:
   said plurality of thrusters includes at least one yaw thruster, at least one pitch thruster, and at least one axial thruster, said at least one yaw and pitch thrusters being powered by hydrogen and oxygen gas from said accumulators, and said at least one axial thruster being powered by a combination of hydrogen and oxygen gas from ullage volumes or said accumulators and the exhaust gas from the internal combustion engine.

4. A system, as claimed in claim 3, further including:
   at least one heat exchanger in communication with said at least one axial thruster for selectively modifying temperature of at least one of said waste ullage gases or liquid propellants prior to transfer of said gases to one of said accumulators.

5. A system, as claimed in claim 1, further including:
   an oxygen pump for pressurizing the oxygen accumulator, and a hydrogen pump for pressurizing the hydrogen accumulator, said pump being driven by corresponding pump motors, said pump motors being powered by at least one of electrical current from said battery and/or mechanical power from said output shaft of said internal combustion engine.

6. A system, as claimed in claim 1, wherein:
   said internal combustion engine includes a Wankel engine, said Wankel engine including an internal rotor rotating within an engine block, said rotor dividing internal space within said engine block into three separate compartments including an intake chamber, a combustion chamber, and an exhaust chamber.

7. A system, as claimed in claim 6, wherein:
   said Wankel engine further includes a cooling jacket surrounding said engine block, and wherein hydrogen gas from hydrogen ullage flows in the space between said engine block and said jacket to cool the engine.

8. A system, as claimed in claim 7, wherein:
   said hydrogen circulating between said cooling jacket and said engine block is further circulated within the engine block to the intake chamber for use as fuel within the engine.

9. A system, as claimed in claim 1, wherein:
   said internal combustion engine, said power generator, said battery, said accumulators, and said plurality of thrusters comprise an IVF module mounted to an aft portion of said launch vehicle.

10. A system, as claimed in claim 9 wherein:
    said IVF module includes a pair of IVF modules, each of said modules mounted to opposing sides of said launch vehicle to provide redundant capabilities.

11. A system, as claimed in claim 1, wherein:
    each of said tanks include a plurality of vent, purge, and bleed lines communicating therewith, each of said hydrogen and oxygen tanks including a vent line, a pressurization line, a bleed line, and a purge line.

12. A system, as claimed in claim 1, wherein:
    said plurality of thrusters is arranged on a thruster panel assembly including a hydrogen manifold and an oxygen manifold for delivering hydrogen and oxygen to said thrusters.

13. A system, as claimed in claim 1, wherein:
    said internal combustion engine includes a piston engine.

14. A method of providing mechanical energy for supporting functions of an upper stage launch vehicle, said method comprising:
    providing:
    (i) a pair of tanks for storage of propellants therein including a hydrogen tank and an oxygen tank;
    (ii) an internal combustion engine powered by hydrogen and oxygen removed from said tanks;

(iii) a power generator communicating with an output shaft of said internal combustion engine for generating electrical current;
(iv) a battery in electrical communication with said generator for storing the electrical current;
(v) a gaseous oxygen accumulator for storing oxygen removed from the oxygen tank;
(vi) a gaseous hydrogen accumulator for storing hydrogen removed from the hydrogen tank;
(vii) a plurality of thrusters to provide attitude and settling control of the launch vehicle;
powering at least one thruster of said plurality of thrusters by exhaust gas from the internal combustion engine;
powering at least one thruster of said plurality of thrusters by oxygen and hydrogen gas from said accumulators; and
powering at least one thruster of said plurality of thrusters by hydrogen and oxygen from the main vehicle tanks.

15. The method of claim 14, further comprising an alternator, and wherein said battery is in communication with said alternator, and said alternator is in communication with said generator, and the battery is charged by current passing through the alternator.

16. A method of pressurizing a propellant tank of an upper stage launch vehicle, said method comprising:
providing:
(i) a pair of tanks for storage of propellants therein including a hydrogen tank and an oxygen tank;
(ii) an internal combustion engine powered by hydrogen and oxygen removed from said tanks, said internal combustion engine having an output shaft;
(iii) a power generator communicating with said output shaft of said internal combustion engine for generating electrical current and for starting the internal combustion engine;
(iv) a battery in electrical communication with said power generator for storing the electrical current;
(v) a gaseous oxygen accumulator for storing oxygen from the oxygen tank;
(vi) a gaseous hydrogen accumulator for storing me hydrogen from the hydrogen tank;
(vii) a plurality of thrusters to provide attitude and settling control of the vehicle;
pressurizing the accumulators by communication with at least one pump, said at least one pump being powered by at least one of electrical current from said battery or mechanical energy from said output shaft of the internal combustion engine; and
pressurizing the tanks by pressurization lines from said accumulators.

17. A method of providing electrical power for an upper stage launch vehicle said method comprising:
providing:
(i) a pair of tanks for storage of propellants therein including a hydrogen tank and an oxygen tank;
(ii) an internal combustion engine powered by hydrogen and oxygen removed from said tanks;
(iii) a power generator communicating with an output shaft of said internal combustion engine;
(iv) a battery in electrical communication with said generator for storing the electrical current;
(v) a gaseous oxygen accumulator for storing oxygen from the oxygen tank;
(vi) a gaseous hydrogen accumulator for storing hydrogen from the hydrogen tank;
(vii) a plurality of thrusters to provide attitude and settling control of the vehicle;
generating electrical current by said electrical power generator driven by an output shaft of the internal combustion engine;
storing the electrical power in the battery; and
selectively using electrical current stored in said battery for electrical systems of said launch vehicle.

18. A method of providing vehicle settling for a space launch vehicle in orbit, said method comprising:
providing:
(i) a pair of tanks for storage of propellants therein including a hydrogen tank and an oxygen tank;
(ii) an internal combustion engine powered by hydrogen and oxygen removed from said tanks;
(iii) a generator communicating with said output shaft of said internal combustion engine for generating electrical current and for starting the internal combustion engine;
(iv) a battery in electrical communication with said generator for storing the electrical current;
(v) a gaseous oxygen accumulator for storing medium pressure oxygen from the oxygen tank;
(vi) a gaseous hydrogen accumulator for storing medium pressure hydrogen from the hydrogen tank;
(vii) a plurality of thrusters to provide attitude and settling control of the vehicle;
activating at least one thruster of said plurality of thrusters by exhaust gas from the internal combustion engine for long duration, low thrust requirements; and
activating at least one thruster of said plurality of thrusters by waste ullage gas stored either in said accumulators, or by venting oxygen and hydrogen from said tanks directly to said at least one thruster.

19. A method of venting propellant tanks of an upper stage launch vehicle, said method comprising:
providing:
(i) a pair of tanks for storage of propellants therein including a hydrogen tank and an oxygen tank;
(ii) an internal combustion engine powered by waste ullage hydrogen and oxygen vented from said tanks, said internal combustion engine having an output shaft;
(iii) an alternator communicating with said output shaft of said internal combustion engine for generating electrical current;
(iv) a battery in electrical communication with said alternator for storing the electrical current;
(v) a gaseous oxygen accumulator for storing moderate pressure oxygen extracted from the main oxygen tank;
(vi) a gaseous hydrogen accumulator for storing moderate pressure hydrogen extracted from the main hydrogen tank;
(vii) a plurality of thrusters to provide attitude and settling control of the vehicle;
(viii) providing a gaseous hydrogen vent line from the hydrogen tank and a gaseous oxygen vent line from said oxygen tank, said vent lines communicating with at least one of said plurality of thrusters; and
venting the propellant tanks by the vent lines and using the gaseous hydrogen and gaseous oxygen as fuel and oxidizer for activation of said at least one of said plurality of thrusters.

* * * * *